United States Patent Office 3,301,821
Patented Jan. 31, 1967

3,301,821
THERMOSTABILIZED POLYOXYMETHYLENE CO-POLYMERS AND PROCESS FOR THEIR MANUFACTURE
Klaus-Dieter Asmus and Edgar Fischer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Feb. 5, 1963, Ser. No. 256,248
Claims priority, application Germany, Feb. 14, 1962, F 36,025
4 Claims. (Cl. 260—67)

The present invention relates to thermostabilized copolymers and to a process for their manufacture.

It is known that polymers of formaldehyde having terminal hydroxyl groups can be completely decomposed in various ways. Paraformaldehyde, for example, depolymerizes by simple heating according to the principle of the zipper reaction. Polyoxymethylenes of higher molecular weight are more suitably decomposed under the action of alkaline catalysts, either in solution or, according to a proposal not yet belonging to the state of the art, in suspension on heating.

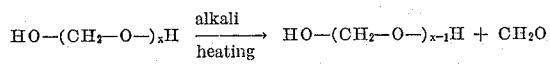

Mixtures of etherified and unetherified polyoxymethylenes can be separated by completely decomposing the unetherified portions by one of the aforesaid methods.

Copolymers, the chains of which essentially consist of polyoxymethylene groups, are likewise unstable under the action of heat. However, if the degradation comes to a standstill at the copolymer component (blocking of the zipper), the copolymers are more stable than the homopolymers. In order to obtain products having a satisfactory thermostability on processing it is necessary to eliminate the terminal polyoxymethylene groups as completely as possible. When copolymers containing polyoxymethylene groups are subjected to a thermal treatment in the presence of alkaline catalysts the usual degradation commences at the terminal groups with splitting off of formaldehyde. The degradation comes to a standstill when the components acting as blocking elements are reached.

Various processes have been proposed for stabilizing polyoxymethylene copolymers by splitting off the unstable terminal groups. This degradation can be performed, for example, in a homogeneous solution of the copolymer in a mixture of methanol and water at 160° C. under pressure and with the addition of small amounts of ammonia as catalyst. However, the further processing of a product treated in this manner is rather difficult. The fibrous and spongy, partially decomposed polymer is difficult to filter, retains large amounts of water and is very sensitive to oxidation because of its large surface.

It is much more favorable to saponify the terminal semi-acetal groups of copolymers of this type by heating them to about 140° C. in an aqueous suspension in the presence of a swelling agent, a base and a formaldehyde acceptor. According to this process, too, polyoxymethylene copolymers having a good thermostability are obtained which can be readily processed in contradistinction to the product hydrolized in homogeneous solution.

It has now been found that copolymers containing polyoxymethylene groups and having terminal oxymethylene groups can be decomposed in an especially simple manner in heterogeneous phase by splitting off the terminal groups when the polymer is treated at a temperature from above 100° C. up to the sintering point of the polymer, preferably in the range of 130° C. to 150° C., with a saturated vapor atmosphere consisting of at least 10%, preferably 50 to 99% of steam, 0.01 to 10%, preferably 0.1 to 5%, of a volatile base as catalyst, and a volatile organic solvent boiling in the range of 60 to 250° C., under the autogenous presence established at the chosen temperature, preferably under a pressure of 3 to 10 atmospheres.

The copolymers having terminal oxymethylene groups contain, besides formaldehyde groups of the formula —OCHR—, a structural unit of the formula

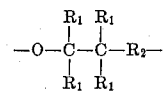

where $R_2$ is oxy or oxyalkylene having 1 to 10 carbon atoms. Such structural units are derivable from glycols such as 1,2-ethane-diol, 1,2-propane-diol, 1,3-propane-diol, 1,2-butane-diol, 1,3-butane-diol, 1,4-butane-diol, 1,2-hexane-diol, 1,6-hexane-diol, 1,8-octane-diol and 1,10-decane-diol.

The temperature at which the degradation is effected depends on the copolymer used. It must be below its sintering temperature. In general, the copolymers are treated at a temperature in the range of 100 to 160° C. and preferably 130–150° C.

The copolymer can be treated, for example, in a heatable autoclave containing a stationary basket made from a fine-meshed net of an inert material, for example, stainless steel. The liquid mixture for generating the vapor atmosphere is fed to the autoclave and the polymer is introduced into the basket in the vapor atmosphere. The reaction space is saturated with vapor by heating the entire system. The pressure depending on the temperature used is established automatically. It is essential that the pressure is in the range of 1 to about 20 atmospheres and preferably 3 to 10 atmospheres. It is still more advantageous to stabilize the polymer in a suitable vapor current under the pressure defined above. In this case the vapor is produced in a separate autoclave, passed through the polymer and then condensed in a cooled device, for example, a cooled tube, from which the condensate is recycled to the vapor generator.

The liquid phase contains the catalyst in the form of a volatile base, advantageously ammonia. It is likewise possible, however, to use other bases, for example, primary, secondary or tertiary alkylamines having 1–20 carbon atoms, preferably 1–10 carbon atoms. There are mentioned by way of example mono-, di-, or trimethylamine, mono-, di-, or triethylamine, mono-, di-, or tri-n-butylamine, hexylamine or dodecylamine; heterocyclic amines such as pyridine or morpholine. The catalysts may be used either individually or in admixture with one another. It is of advantage, as already mentioned above, that 0.01 to 10% and preferably 0.1 to 5% of the saturated vapor consist of vaporous catalyst.

In order to achieve a complete degradation of the sensitive terminal groups in the total amount of polymer grain a volatile organic solvent suitably boiling at a temperature in the range of 60 to 250° C. is added to the liquid phase, which solvent is capable of swelling the polymer at least partially. When the polymer is treated with the vapor of such a mixture, the grain swells and becomes porous so that the catalyst can penetrate. In this manner the complete degradation of the terminal groups is insured inside of the polymer grain, too. Especially suitable swilling agents are, for example, low molecular weight aliphatic alcohols such as methanol, n- and iso-propanol and the isomeric butanols; as well as aromatically substituted aliphatic alcohols such as benzyl alcohol; low molecular weight ketones such as acetone, methylethyl ketone; acyclic ethers such as mono- and dialkyl ethers of alcohols having 1–4 carbon atoms; furthermore, cyclic ethers such as dioxane and tetra-hydrofurane, and ethylene glycol and diethylene glycol mono- and diethers. When water is concomitantly used it is not absolutely necessary that the specified solvents are miscible therewith in all proportions; they must form an azeotrope with water, such as, for example, benzyl alcohol. In general, it is of advantage to use one or several organic swelling agents in an amount such that 1 to 50% of the saturated vapor consists of vaporous swelling agent.

In order to prevent discolorations which may occur it is suitable to add urea to the liquid phase in an amount of 0.5 to 5%, calculated on the weight of the liquid phase.

The upper limit of the reaction temperature is determined by the sintering point of the swollen copolymer which depends on the nature and concentration of the cocomponents in the polymer, the nature and concentration of the swelling agent used and on the molecular weight of the polymer. For reaching a complete hydrolysis of the unstable semi-acetal terminal groups it is especially suitable to operate at the highest possible temperature, since after the swelling the complete degradation of the terminal groups takes place in a particularly easy manner. In general, the swelling commences at a temperature in the range from the sintering temperature to about 5° C. below said temperature, so that it is advantageous to operate in this temperature range. It is likewise possible, however, to operate at a lower temperature, for example 20° C. below the sintering temperature. The reaction time strongly depends on the reaction temperature. In general, the reaction takes 5 to 60 minutes. In the case of copolymers of trioxane and 2% of ethylene oxide having a molecular weight of about 30,000, a treatment of 5 to 15 minutes at a temperature of 140° C. already yields products having a good thermostability.

After the treatment the polymer can be processed in an especially simple manner. The sump is withdrawn by opening the valve at the bottom of the reaction vessel and the pressure in the reaction vessel is completely released. The major part of the solvent adhering to the polymer and retained in the swollen polymer is blown off by this measure. In order to completely eliminated the volatile components the polymer may be treated with steam for a short period of time. In this manner a very pure and dry copolymer is obtained which can directly be subjected to further stabilization.

If the copolymers are treated under identical conditions at atmospheric pressure, not with a saturated vapor current but with a vapor current having the same temperature and the same composition, a noteworthy degradation of the terminal groups does not take place.

The advantages of the process of the invention are the following:

(1) The process can be carried out without the use of large apparatus.

(2) During the reaction the copolymer does not come into contact with the degration products because these are continuously extracted from the polymer.

(3) The usual expensive processing of the product, such as filtration, washing and drying, is not necessary.

(4) The polymer is obtained in gritty, readily flowable form which is easy to handle.

(5) Very small amounts of solvent are sufficient.

(6) With a practically unchanged melting index the polymers have an excellent thermostability. They can be used with special advantage for example for the manufacture of shaped articles.

The following examples serve to illustrate the invention but they are not intended to limit it thereto, the parts being by weight unless otherwise stated. The composition of the vapor phase need not be identical with that of the liquid phase, the values given in the description as well as in the examples relate to the composition of the liquid phase unless otherwise stated.

*Example 1*

A heatable glass autoclave was charged with a solution consisting of 20 cc. of n-propanol, 4 cc. of concentrated ammonia, 5 grams of urea and 85 cc. of water. In the autoclave a stationary basket made from a net of stainless steel, the content of which could be stirred by a suitable stirring device, was filled with 200 grams of a copolymer of 98% of trioxane and 2% of ethylene oxide. The basket was above the level of the liquid. The autoclave was purged three times with nitrogen, then heated at 140° C. while the polymer was stirred and maintained at 140° C. for 15 minutes. The reaction being terminated, the liquid phase was withdrawn, the pressure in the autoclave was released and a nitrogen current was passed through the polymer for a short period of time. A white dry polymer which was stable to heat was obtained in a yield of 94%.

A sample of the polymer which was additionally stabilized with 0.7% of 2,2-methylene-bis-4-methyl-6-tert.-butyl-phenol and 0.2% of dicyanodiamide and heated for 30 minutes at 230° C. lost 0.7% of its weight in a nitrogen atmosphere and 4.2% of its weight in an oxygen atmosphere.

*Example 2*

In a 2 liter glass autoclave, the lower outlet of which was provided above the valve with a fine-meshed screen of stainless steel, 400 grams of a copolymer of 98% of trioxane and 2% of ethylene oxide were heated at 140° C., while stirring well. At the bottom of the autoclave a vapor of 140° C. was blown in which was generated in a separate autoclave by heating a solution consisting of 20 cc. of methanol, 20 cc. of concentrated ammonia and 120 cc. of water. After having passed the polymer the vapor was withdrawn at the top of the autoclave, condensed and recycled to the vapor generator. After 15 minutes the supply of vapor was interrupted, the pressure in the autoclave was released and steam of 140° C. was passed for a short period of time through the polymer at atmospheric pressure. A white and dry product was obtained in a yield of 92%.

Samples of the product were stabilized additionally with 0.7% of 2,2 - methylene-bis-4-methyl-6-tert.-butylphenol and 0.2% of dicyanodiamide and heated for 30 minutes at 230° C. A sample thus stabilized lost 1.2% of its weight in a nitrogen atmosphere and 3.6% of its weight in an oxygen atmosphere.

When a copolymer of 98% of trioxane and 2% of ethylene oxide was treated with the vapor of the aforesaid solution at atmospheric pressure, the other conditions being the same, only a slight degradation could be observed.

*Example 3*

100 grams of a copolymer from 96 parts of trioxane and 4 parts of diethylene glycol formal (difo) were treated as described in Example 1 for 30 minutes at a temperature of 138° C. under autogeneous pressure with the vapor of a solution consisting of 40 parts by volume of ethyl alcohol, 120 parts by volume of water and 5 parts by volume of an aqueous dimethylamine solution of 40% strength. The product was processed as described in Example 1. 92 parts of a thermostable, white polymer were obtained. The product was tested as defined in Example 1. A sample lost 0.8% of its weight in a nitrogen atmosphere and 4.1% of its weight in an oxygen atmosphere.

*Example 4*

250 grams of a copolymer prepared from 95 parts of trioxane and 5 parts of glycol formal were treated as described in Example 1 for 50 minutes at 136° C. under autogeneous pressure with the vapor of a solution consisting of 100 parts of water, 100 parts of ethylene glycol monomethyl ether, 20 parts of aqueous ammonia of 20% strength and 5 parts of urea. The product was further processed and tested as described in Example 1. It lost 1.1% of its weight under nitrogen and 5.0% of its weight under oxygen.

*Example 5*

200 parts of a copolymer of trioxane and 2 mol percent of hexane-diol formal were treated as described in Example 1 for 15 minutes at 140° C. under autogeneous pressure with the vapor of a solution consisting of 3 parts of pyridine, 50 parts of tertiary butanol and 150 parts of water. The product was further processed and tested as described in Example 1. After processing the yield amounted to 94%. The product lost 0.8% of its weight under nitrogen and 3.8% of its weight under oxygen.

We claim:
1. A process for thermostabilizing a copolymer having terminal oxymethylene groups by removing said terminal oxymethylene groups, the repeating units of said copolymer consisting essentially of —OCHR— groups interspersed with glycol structural units of the formula

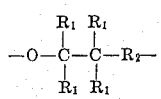

wherein R and $R_1$ are selected from the group consisting of hydrogen and alkyl having 1 to 10 carbon atoms, and $R_2$ is a member selected from the group consisting of oxy and oxyalkylene having 1 to 10 carbon atoms, which method comprises treating said copolymer at a temperature of 100° C. to 160° C. and at autogenous pressure with a saturated vapor mixture of water, a volatile organic swelling agent for said copolymer, said swelling agent boiling at a temperature of 60° C. to 250° C., and a volatile base catalyzing said removal of terminal oxymethylene groups, said volatile base being at least one member selected from the group consisting of ammonia, an alkyl amine having 1 to 20 carbon atoms, and a heterocyclic amine.

2. The process of claim 1 wherein said autogenous pressure is from 3 to 10 atmospheres.

3. The process of claim 1, wherein the volatile organic swelling agent boiling at a temperature in the range of 60–250° C. is at least one member selected from the group consisting of an aliphatic alcohol, an aromatically substituted aliphatic alcohol, an aliphatic ketone and an ether.

4. The process of claim 1 wherein said structural unit is at least one member selected from the group consisting of 1,2-dioxy-ethylene, 1,2-dioxy-propylene, 1,3-dioxy-propylene, 1,2-dioxy-butylene, 1,3-dioxy-butylene, 1,4-dioxy-butylene, 1,2-dioxy-hexylene, 1,6-dioxy-hexylene, 1,8-dioxy-octylene and 1,10-dioxy-decylene.

References Cited by the Examiner

UNITED STATES PATENTS

| | | | |
|---|---|---|---|
| 2,376,354 | 5/1945 | Gresham | 260—67 |
| 2,989,509 | 6/1961 | Hudgin et al. | 260—67 |
| 3,103,499 | 9/1963 | Dolce et al. | 260—67 |
| 3,174,948 | 3/1965 | Wall et al. | 260—67 |
| 3,219,623 | 11/1965 | Berardinelli | 260—67 |
| 3,225,005 | 12/1965 | Asmus et al. | 260—67 |

FOREIGN PATENTS

| | | |
|---|---|---|
| 218,743 | 12/1961 | Austria. |
| 582,945 | 9/1959 | Canada. |
| 770,717 | 3/1957 | Great Britain. |
| 848,660 | 9/1960 | Great Britain. |

OTHER REFERENCES

Kern et al.: Angewandt Chemie, 73, No. 6. pp. 177–186 (March 1961). Note especially pp. 183–186, QD1Z5.

SAMUEL H. BLECH, *Primary Examiner.*

WILLIAM H. SHORT, *Examiner.*

L. M. MILLER, *Assistant Examiner.*